United States Patent
Lee et al.

(10) Patent No.: US 12,487,379 B2
(45) Date of Patent: Dec. 2, 2025

(54) LENS ASSEMBLY AND ELECTRONIC DEVICE INCLUDING THE SAME

(71) Applicant: Samsung Electronics Co., Ltd., Gyeonggi-do (KR)

(72) Inventors: Jeongyeol Lee, Gyeonggi-do (KR); Jungpa Seo, Gyeonggi-do (KR); Sungwook Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 798 days.

(21) Appl. No.: 17/723,672

(22) Filed: Apr. 19, 2022

(65) Prior Publication Data
US 2023/0019936 A1  Jan. 19, 2023

Related U.S. Application Data

(63) Continuation of application No. PCT/KR2022/003749, filed on Mar. 17, 2022.

(30) Foreign Application Priority Data

Jul. 15, 2021  (KR) .......................... 10-2021-0092649

(51) Int. Cl.
  *G02B 3/14*   (2006.01)
  *G02B 9/64*   (2006.01)
  (Continued)

(52) U.S. Cl.
  CPC ................ *G02B 3/14* (2013.01); *G02B 9/64* (2013.01); *G02B 13/0045* (2013.01); *G02B 13/18* (2013.01)

(58) Field of Classification Search
  CPC ............... G02B 26/004; G02B 26/005; G02B 13/0075; G02B 3/14; G02B 9/34–64; G02B 13/0045
  See application file for complete search history.

(56) References Cited

U.S. PATENT DOCUMENTS 10,241,240 B1    3/2019  Choi
2004/0245437 A1* 12/2004 Greenberg ............... G02B 7/38
                                                                     250/216
(Continued)

FOREIGN PATENT DOCUMENTS

CN       101620311 A    1/2010
EP         1906654 A1    4/2008
(Continued)

OTHER PUBLICATIONS

Gross et al. "Handbook of Optical Systems vol. 3: Aberration Theory and Correction of Optical Systems" Weinheim Germany, Wiley-VCH Verlag GmbH & Co. KGaA, pp. 377-379 (Year: 2007).*

(Continued)

*Primary Examiner* — Cara E Rakowski
(74) *Attorney, Agent, or Firm* — Cha & Reiter, LLC.

(57) ABSTRACT

According to various embodiments disclosed herein, a lens assembly and/or an electronic device including the same may include at least four lenses which are sequentially arranged along an optical axis from an object side to a sensor side, and a tunable lens disposed between two lenses selected from among the at least four lenses and configured such that power or curvature thereof can be changed, wherein the lens assembly may satisfy Conditional Expression 1 below:

$$1.0 \leq (H\text{tun\_max})/(H\text{tot\_min}) \leq 3.0 \quad \text{[Conditional Expression 1]}$$

where "Htun_max" represents a maximum height of marginal ray of the tunable lens, and "Htot_min" represents a minimum height of marginal ray of the entire lens assembly.

21 Claims, 10 Drawing Sheets

(51) Int. Cl.
    *G02B 13/00*     (2006.01)
    *G02B 13/18*     (2006.01)

(56) References Cited

U.S. PATENT DOCUMENTS

| | | |
|---|---|---|
| 2010/0118413 A1 | 5/2010 | Kim et al. |
| 2011/0222163 A1 | 9/2011 | Hirabayashi |
| 2012/0105971 A1 | 5/2012 | Lee et al. |
| 2012/0261551 A1 | 10/2012 | Rogers |
| 2017/0315274 A1 | 11/2017 | Park et al. |
| 2018/0275320 A1* | 9/2018 | Hsieh .................. G02B 13/004 |
| 2018/0321572 A1 | 11/2018 | Ha |
| 2018/0372985 A1* | 12/2018 | Nunnink ................ H04N 23/54 |
| 2019/0171878 A1* | 6/2019 | Jeong .................... G02B 7/028 |
| 2020/0096770 A1 | 3/2020 | Pedder et al. |
| 2021/0048629 A1* | 2/2021 | Kuo ..................... G02B 26/004 |
| 2022/0043190 A1* | 2/2022 | Kwon ................ G02B 13/0075 |
| 2022/0236515 A1* | 7/2022 | Wang ................ G02B 13/0075 |
| 2022/0236539 A1* | 7/2022 | Gao .................. G02B 13/0075 |
| 2022/0382020 A1* | 12/2022 | Kwon ..................... G02B 3/12 |
| 2023/0057429 A1* | 2/2023 | Kwon .................. G02B 27/646 |
| 2024/0210654 A1* | 6/2024 | Wu ....................... G03B 13/36 |

FOREIGN PATENT DOCUMENTS

| | | |
|---|---|---|
| JP | 2009-216946 A | 9/2009 |
| JP | 2011-191407 A | 9/2011 |
| KR | 10-0234236 B1 | 12/1999 |
| KR | 10-2010-0052115 A | 5/2010 |
| KR | 10-2012-0045517 A | 5/2012 |
| KR | 10-2018-0099148 A | 9/2018 |
| KR | 10-2018-0123376 A | 11/2018 |
| KR | 10-2020-0004279 A | 1/2020 |
| KR | 10-2020-0085674 A | 7/2020 |
| KR | 10-2021-0041909 A | 4/2021 |

OTHER PUBLICATIONS

International Search Report dated Jun. 17, 2022.
Extended European Search Report dated Oct. 21, 2024.

* cited by examiner

LENS ASSEMBLY AND ELECTRONIC DEVICE INCLUDING THE SAME

CROSS-REFERENCE TO RELATED APPLICATIONS

This application is a continuation of International Application No. PCT/KR2022/003749 designating the United States, filed on Mar. 17, 2022, in the Korean Intellectual Property Receiving Office and claiming priority to Korean Patent Application No. 10-2021-0092649, filed on Jul. 15, 2021, in the Korean Intellectual Property Office, the disclosures of which are incorporated by reference herein in their entireties.

BACKGROUND

Technical Field

Certain embodiments disclosed herein relate to an electronic device. For example, certain embodiments relate to a lens assembly and/or an electronic device including the same.

Background Art

As electronic, information, and communication technologies have developed, various functions have come to be integrated into a single electronic device. For example, a smartphone includes functions of an audio reproduction device, an imaging device, or a digital diary, in addition to a communication function, and a greater variety of functions may be implemented in the smartphone through installation of additional applications. An electronic device may be provided with various pieces of information in real time by accessing a server or another electronic device in a wired or wireless manner as well as by executing an installed application or a stored file.

As various functions are implemented in single electronic devices (e.g., smartphones), electronic devices such as sound playback devices performing a specific function have already been replaced by smartphones, and the areas of video playback devices or imaging devices are also gradually being replaced by smartphones. In a miniaturized electronic device, since optical performances may be limited, it is possible to enhance the quality of captured images or videos by implementing an imaging function using a plurality of cameras or a plurality of image sensors. For example, electronic devices such as smartphones are replacing compact cameras, and it is expected that the electronic devices may replace high-performance cameras such as single-lens reflex cameras in the future.

The above-described information may be provided as background for the purpose of helping understanding of the disclosure of this document. No claim or determination is made as to whether any of the foregoing may be applied as prior art regarding the disclosure of this document.

In a miniaturized electronic device such as a smartphone, it may be difficult to mount an optical device such as a camera or a lens assembly. For example, in a miniaturized electronic device, it may be difficult to secure a space in which a lens assembly is movable forward and backward in performing an imaging function such as a focusing operation. By increasing the thickness of the electronic device, a space in which the lens assembly is movable forward and rearward while being accommodated may be secured, but increasing the thickness may be an obstacle to miniaturization of the electronic device. When an electronic device is reduced in thickness while securing a space in which the lens assembly is accommodated and is movable forward and rearward, an area in which a camera or the lens assembly is disposed protrudes outward from the appearance of the electronic device. Thus, the appearance of the electronic device may be degraded. By limiting the forward and backward movement of the lens assembly, it is possible to achieve a harmony between the miniaturization of the electronic device and the appearance of the electronic device. However, in this case, it is practically impossible to perform focusing, and thus the quality of a captured image or video may be degraded.

Various embodiments disclosed herein are intended to at least solve the above-mentioned problems and/or disadvantages and provide at least the advantages to be described below, and are able to provide a lens assembly that can be easily mounted in a miniaturized or thinned electronic device and/or an electronic device including the lens assembly.

Various embodiments disclosed herein are able to provide a lens assembly that can be easily mounted in a miniaturized or thinned electronic device to be easily harmonized with the appearance of the electronic device and/or an electronic device including the lens assembly.

Various embodiments disclosed herein are able to provide a lens assembly that can be easily mounted in a miniaturized or thinned electronic device to improve the quality of a captured image or video and/or an electronic device including the lens assembly.

Additional aspects according to various embodiments will be presented through a detailed description set forth below, and may in part become apparent from the description or be understood through presented implementation embodiments.

SUMMARY

According to certain embodiments disclosed herein, a lens assembly and/or an electronic device including the same may include at least four lenses which are sequentially arranged along an optical axis from an object side to a sensor side, and a tunable lens disposed between two lenses selected from among the at least four lenses and configured such that power or curvature thereof can be changed, wherein the lens assembly may satisfy Conditional Expression 1 below:

$$1.0 =< (H\text{tun\_max})/(H\text{tot\_min}) =< 3.0, \quad \text{[Conditional Expression 1]}$$

where, "Htun_max" represents a maximum height of marginal ray of the tunable lens, and "Htot_min" represents a minimum height of marginal ray of the entire lens assembly.

According to certain embodiments disclosed herein, a lens assembly and/or an electronic device including the same may include at least four lenses which are sequentially arranged along an optical axis from an object side to a sensor side, and a tunable lens disposed between two lenses selected from among the at least four lenses and configured such that power or curvature thereof can be changed, wherein the tunable lens may include a transparent plate disposed as an object-side surface or a sensor-side surface, a polymer plate disposed to face the transparent plate and having a changeable curvature, a sealing member coupling the transparent plate and the polymer plate to each other, and sealing a space between the transparent plate and the polymer plate, and a liquid state or gel state medium accommodated in the space between the transparent plate and the polymer plate, wherein the medium may have a refractive index n1 that satisfies Conditional Expression 7 below:

$$1.25 =< n1 =< 1.7 \qquad \text{[Conditional Expression 7]}$$

According to certain embodiments disclosed herein, an electronic device may include a housing, a display disposed on a first surface of the housing, and at least one lens assembly to be described below disposed on the first surface or a second surface of the housing that faces away from the first surface.

According to various embodiments disclosed herein, since a camera, a lens assembly, and/or an electronic device including the same include a tunable lens, the power or curvature of which can be changed, a focal length can be adjusted even if the lens assembly does not move forward or rearward. For example, since focusing can be performed even without securing a space for a lens assembly to move forward and rearward, the lens assembly can be easily mounted in a miniaturized or thinned electronic device. Accordingly, while being mounted in a miniaturized or thinned electronic device, the lens assembly can contribute to realizing a harmonious appearance in the electronic device. In another embodiment, since the lens assembly includes a tunable lens, a captured image or video improved in quality can be acquired while being mounted in a miniaturized or thinned electronic device. In addition, various effects recognized directly or indirectly through this document may be provided.

BRIEF DESCRIPTION OF DRAWINGS

The above-described aspects or other aspects, configurations, and/or advantages regarding certain embodiments disclosed herein may become more apparent through the following detailed description made with reference to the accompanying drawings.

Throughout the appended drawings, like reference numerals may be assigned to like parts, components, and/or structures.

DETAILED DESCRIPTION

Figure 1:
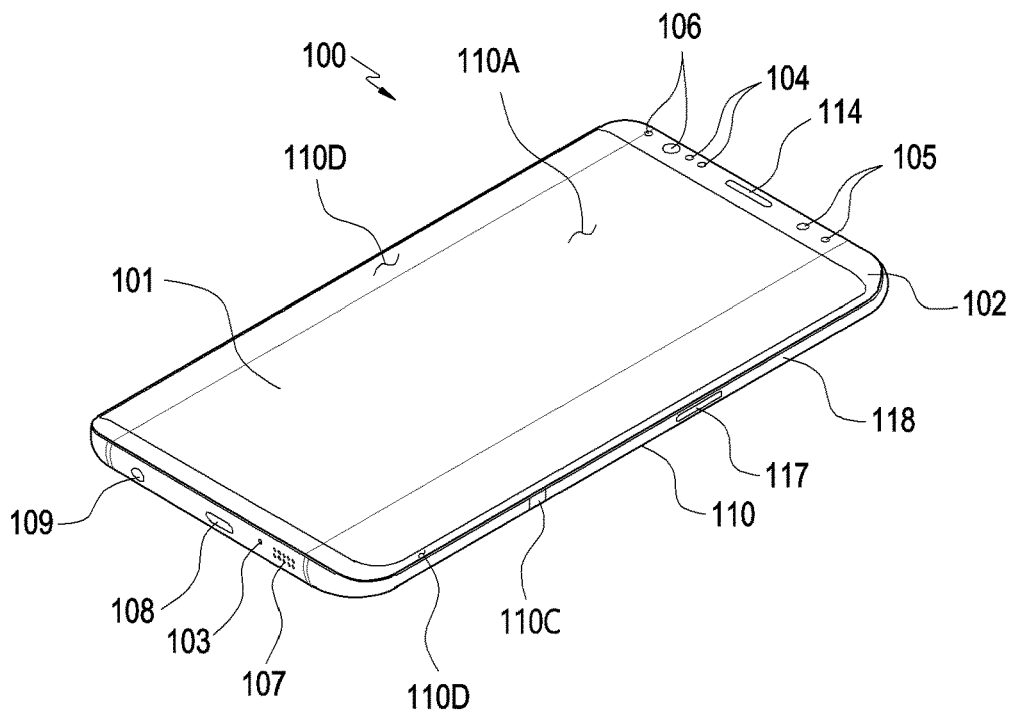
FIG. 1 is a perspective view illustrating the front side of an electronic device including a lens assembly according to certain embodiments disclosed herein.

The following description made with reference to the appended drawings may be provided in order to help comprehensive understanding of the various implementations of the disclosure defined by the claims and their equivalents. A specific embodiment disclosed in the following description includes various specific details to help understanding, but is considered to be one of certain embodiments. Accordingly, it will be apparent to those skilled in the art that various changes and modifications of the various implementations described herein can be made without departing from the scope and spirit of the disclosure. In addition, descriptions of well-known functions and configurations may be omitted for clarity and brevity.

The terms and words used in the following description and claims are not limited to a bibliographical meaning, but may be used to clearly and consistently describe the certain embodiments disclosed herein. Therefore, it will be obvious to those skilled in the art that the following description of various implementations of the disclosure is provided only for the purpose of explanation, not for the purpose of limiting the disclosure defined as the scope of rights and equivalents thereto.

It should be understood that the singular forms of "a", "an", and "the" include plural meanings, unless the context clearly indicate otherwise. Thus, for example, "a component surface" may mean including one or more of component surfaces.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with certain embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program) including one or more instructions that are stored in a storage medium (e.g., internal memory or external memory) that is readable by a machine (e.g., the electronic device). For example, a processor (e.g., the processor) of the machine (e.g., the electronic device) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 2:
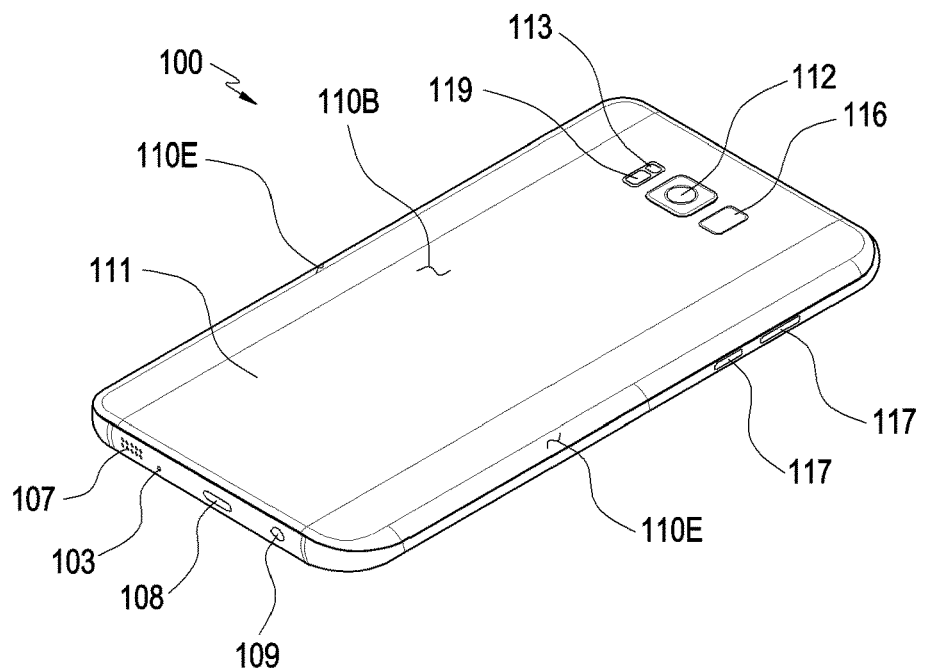
FIG. 2 is a perspective view illustrating the rear side of the electronic device illustrated in FIG. 1.

FIG. 1 is a perspective view illustrating the front side of an electronic device 100 according to certain embodiments disclosed herein. FIG. 2 is a perspective view illustrating the rear side of the electronic device 100 illustrated in FIG. 1.

Referring to FIGS. 1 and 2, the electronic device 100 according to an embodiment may include a housing 100 including a first surface (or a front surface) 110A, a second surface (or a rear surface) 110B, and a side surface 110C surrounding the space between the first surface 110A and the second surface 110B. In another embodiment (not illustrated), the term "housing" may mean a structure defining some of the first surface 110A, the second surface 110B, and the side surface 110C of FIG. 1. According to an embodiment, at least a portion of the first surface 110A may be defined by a substantially transparent front plate 102 (e.g., a glass plate or a polymer plate including various coating layers). The second surface 110B may be defined by a substantially opaque rear plate 111. The rear plate 111 may be made of, for example, coated or colored glass, ceramic, polymer, metal (e.g., aluminum, stainless steel (STS), or magnesium), or a combination of two or more of these materials. The side surface 110C may be defined by a side structure 118 (e.g., a side bezel structure) coupled to the front plate 102 and the rear plate 111 and including a metal and/or a polymer. In some embodiments, the rear plate 111 and the side structure 118 are integrated with each other and may include the same material (e.g., a metal material such as aluminum).

In the illustrated embodiment, the front plate 102 may include two first areas 110D, which are bent from the first surface 110A toward the rear plate 111 and extend seamlessly, at the long opposite side edges thereof. In the illustrated embodiment (see FIG. 2), the rear plate 111 may include two second areas 110E, which are bent from the second surface 110B toward the front plate 102 and extend seamlessly, at the long opposite side edges thereof. In some embodiments, the front plate 102 (or the rear plate 111) may include only one of the first areas 110D (or the second areas 110E). In another embodiment, some of the first areas 110D or the second areas 110E may not be included. In the above-described embodiments, when viewed from a side of the electronic device 100, the side structure 118 may have a first thickness (or width) on the side surfaces, which do not include the first areas 110D or the second areas 110E, and may have a second thickness (or width), which is smaller than the first thickness, on the side surfaces, which include the first areas 110D or the second areas 110E.

According to an embodiment, the electronic device 100 may include at least one of a display 101, audio modules 103, 107, and 114, sensor modules 104, 116, and 119, camera modules 105, 112, and 113, key input devices 117, light-emitting elements 106, and connector holes 108 and 109. In some embodiments, in the electronic device 100, at least one of the components (e.g., the key input devices 117 or the light-emitting elements 106) may be omitted, or other components may be additionally included.

The display 101 may be exposed through a substantial portion of, for example, the front plate 102. In some embodiments, at least a portion of the display 101 may be exposed through the front plate 102 defining the first surface 110A and the first areas 110D of the side surfaces 110C. In some embodiments, the edges of the display 101 may be configured to be substantially the same as the shape of the periphery of the front plate 102 adjacent thereto. In another embodiment (not illustrated), the distance between the periphery of the display 101 and the periphery of the front plate 102 may be substantially constant in order to enlarge the exposed area of the display 101.

In another embodiment (not illustrated), recesses or openings may be provided in a portion of a screen display area of the display 101, and at least one of an audio module 114, a sensor module 104, a camera module 105, and a light-emitting element 106, which are aligned with the recesses or the openings, may be included. In another embodiment (not illustrated), the rear surface of the screen display area of the display 101 may include at least one of an audio module 114, a sensor modules 104, a camera module 105, a fingerprint sensor 116, and a light-emitting element 106. In another embodiment (not illustrated), the display 101 may be coupled to or disposed adjacent to a touch-sensitive circuit, a pressure sensor capable of measuring a touch intensity (pressure), and/or a digitizer configured to detect a magnetic field-type stylus pen. In some embodiments, at least some of the sensor modules 104 and 119 and/or at least some of the key input devices 117 may be disposed in the first areas 110D and/or the second areas 110E.

The audio modules 103, 107, and 114 may include a microphone hole 103 and speaker holes 107 and 114. The microphone hole 103 may include a microphone disposed therein to acquire external sound, and in some embodiments, a plurality of microphones may be disposed therein to be able to detect the direction of sound. The speaker holes 107 and 114 may include an external speaker hole 107 and a call receiver hole 114. In some embodiments, the speaker holes 107 and 114 and the microphone hole 103 may be implemented as a single hole, or a speaker may be included therein without the speaker holes 107 and 114 (e.g., a piezo speaker).

The sensor modules 104, 116, and 119 may generate electrical signals or data values corresponding to the internal operating state or the external environmental state of the electronic device 100. The sensor modules 104, 116, and 119 may include, for example, a first sensor module 104 (e.g., a proximity sensor) and/or a second sensor module (not illustrated) (e.g., a fingerprint sensor) disposed on the first surface 110A of the housing 110, and/or a third sensor module 119 (e.g., an HRM sensor) and/or a fourth sensor module 116 (e.g., a fingerprint sensor) disposed on the second surface 110B of the housing 110. The fingerprint sensor may be disposed not only on the first surface 110A of the housing 110 (e.g., the display 101), but also on the second surface 110B. The electronic device 100 may further include the sensor module 176 of FIG. 1, for example, at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor 104.

The camera modules 105, 112, and 113 may include a first camera device 105 disposed on the first surface 110A of the electronic device 100, a second camera device 112 disposed on the second surface 110B thereof, and/or a flash 113. The camera devices 105 and 112 may include one or more lenses, an image sensor, and/or an image signal processor. The flash 113 may include, for example, a light-emitting diode or a xenon lamp. In some embodiments, one or more lenses (e.g., an infrared camera, a wide-angle lens, and a telephoto lens), and image sensors may be disposed on one surface of the electronic device 100.

The key input devices 117 may be disposed on the side surface 110C of the housing 110. In another embodiment, the electronic device 100 may not include some or all of the above-mentioned key input devices 117, and a key input device 117, which is not included in the electronic device 100, may be implemented in another form, such as a soft key, on the display 101. In some embodiments, the key input devices may include a sensor module 116 disposed on the second surface 110B of the housing 110.

The light-emitting elements 106 may be disposed, for example, on the first surface 110A of the housing 110. The light-emitting elements 106 may provide, for example, information about the state of the electronic device 100 in an optical form. In another embodiment, the light-emitting elements 106 may provide a light source that is interlocked with, for example, the operation of the camera module 105. The light-emitting elements 106 may include, for example, an LED, an IR LED, and a xenon lamp.

The connector holes 108 and 109 may include a first connector hole 108, which is capable of accommodating a connector (e.g., a USB connector) for transmitting/receiving power and/or data to/from an external electronic device, and/or a second connector hole 109, which is capable of accommodating a connector (e.g., an earphone jack) for transmitting/receiving an audio signal to/from an external electronic device.

Figure 3:
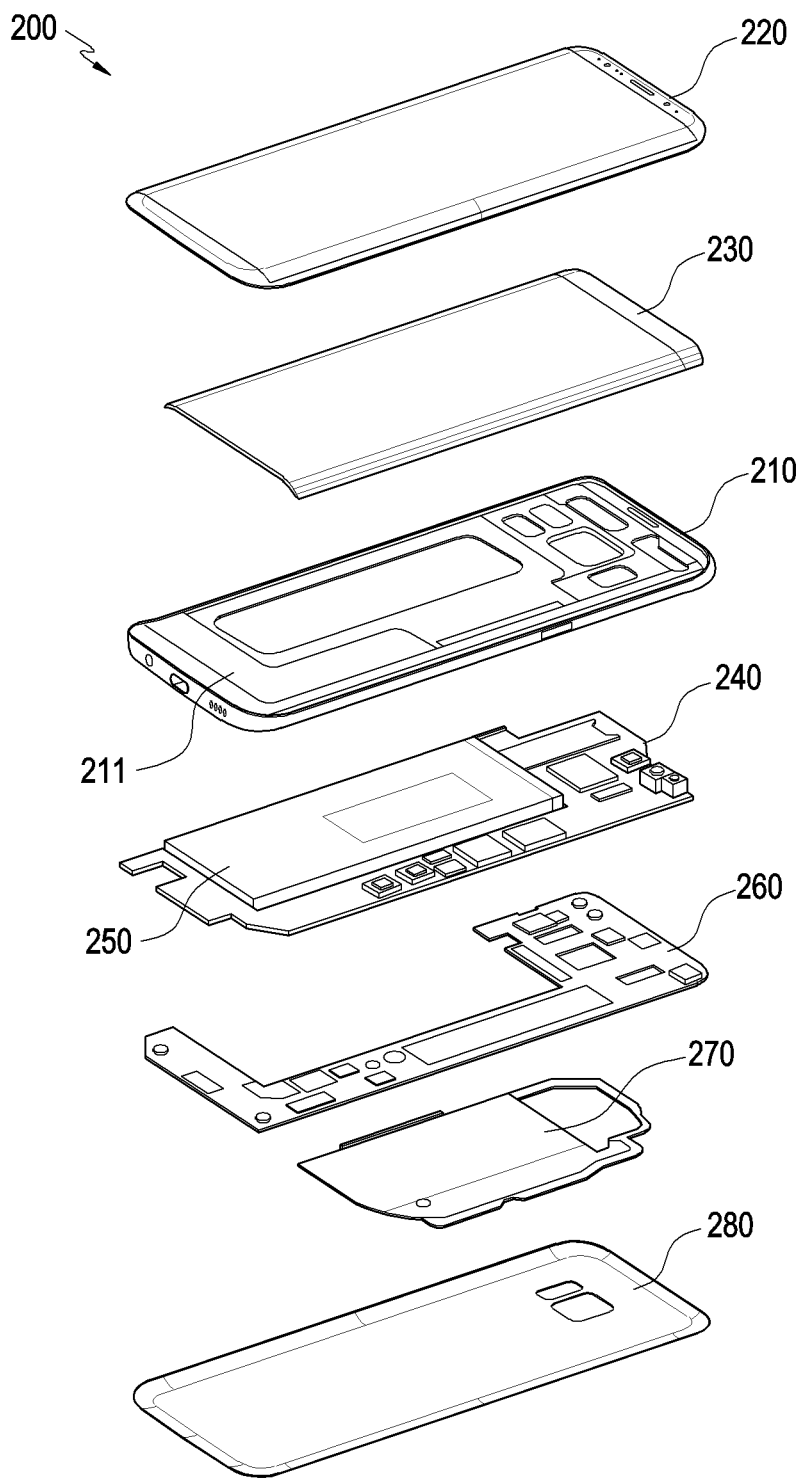
FIG. 3 is an exploded perspective view illustrating the electronic device illustrated in FIG. 1.

FIG. 3 is an exploded perspective view illustrating the electronic device 200 illustrated in FIG. 1.

Referring to FIG. 3, an electronic device 200 may include a side structure 210, a first support member 211 (e.g., a bracket), a front plate 220, a display 230, a printed circuit board 240, a battery 250, a second support member 260 (e.g., a rear case), an antenna 270, and a rear plate 280. In some embodiments, in the electronic device 200, at least one of the components (e.g., the first support member 211 or the second support member 260) may be omitted, or other components may be additionally included. At least one of the components of the electronic device 200 may be the same as or similar to at least one of the components of the electronic device 100 of FIG. 1 or 2, and a redundant description thereof will be omitted below.

The first support member 211 may be disposed inside the electronic device 200, and may be connected to the side structure 210 or may be integrated with the side structure 210. The first support member 211 may be formed of, for example, a metal material and/or a non-metal (e.g., polymer) material. The display 230 may be coupled to one surface of the first support member 211, and the printed circuit board 240 may be coupled to the other surface of the first support member 211. On the printed circuit board 240, a processor, a memory, and/or an interface may be mounted. The processor may include one or more of, for example, a central processing unit, an application processor, a graphics processor, an image signal processor, a sensor hub processor, or a communication processor.

The memory may include, for example, a volatile memory or a nonvolatile memory.

The interface may include, for example, a high-definition multimedia interface (HDMI), a universal serial bus (USB) interface, an SD card interface, and/or an audio interface. The interface may electrically or physically connect, for example, the electronic device 200 to an external electronic device and may include a USB connector, an SD card/an MMC connector, or an audio connector.

The battery 250 is a device for supplying power to at least one component of the electronic device 200, and may include, for example, a non-rechargeable primary battery, a rechargeable secondary battery, or a fuel cell. At least a portion of the battery 250 may be disposed on substantially the same plane as, for example, the printed circuit board 240. The battery 250 may be integrally disposed inside the electronic device 200, or may be disposed to be detachable from the electronic device 200.

The antenna 270 may be disposed between the rear plate 280 and the battery 250. The antenna 270 may include, for example, a near field communication (NFC) antenna, a wireless charging antenna, and/or a magnetic secure transmission (MST) antenna. The antenna 270 may perform short-range communication with, for example, an external electronic device, or may transmit/receive power required for charging to/from the external device in a wireless manner. In another embodiment, an antenna structure may be provided by a portion of the side structure 210 and/or a portion of the first support member 211, or a combination thereof.

It should be noted that, in the following detailed description, reference may be made to the electronic devices 100 and 200 of the preceding embodiments, and, for the components that can be easily understood through the preceding embodiments, the same reference numerals may be denoted or omitted, or a detailed description thereof may also be omitted.

Figure 4:
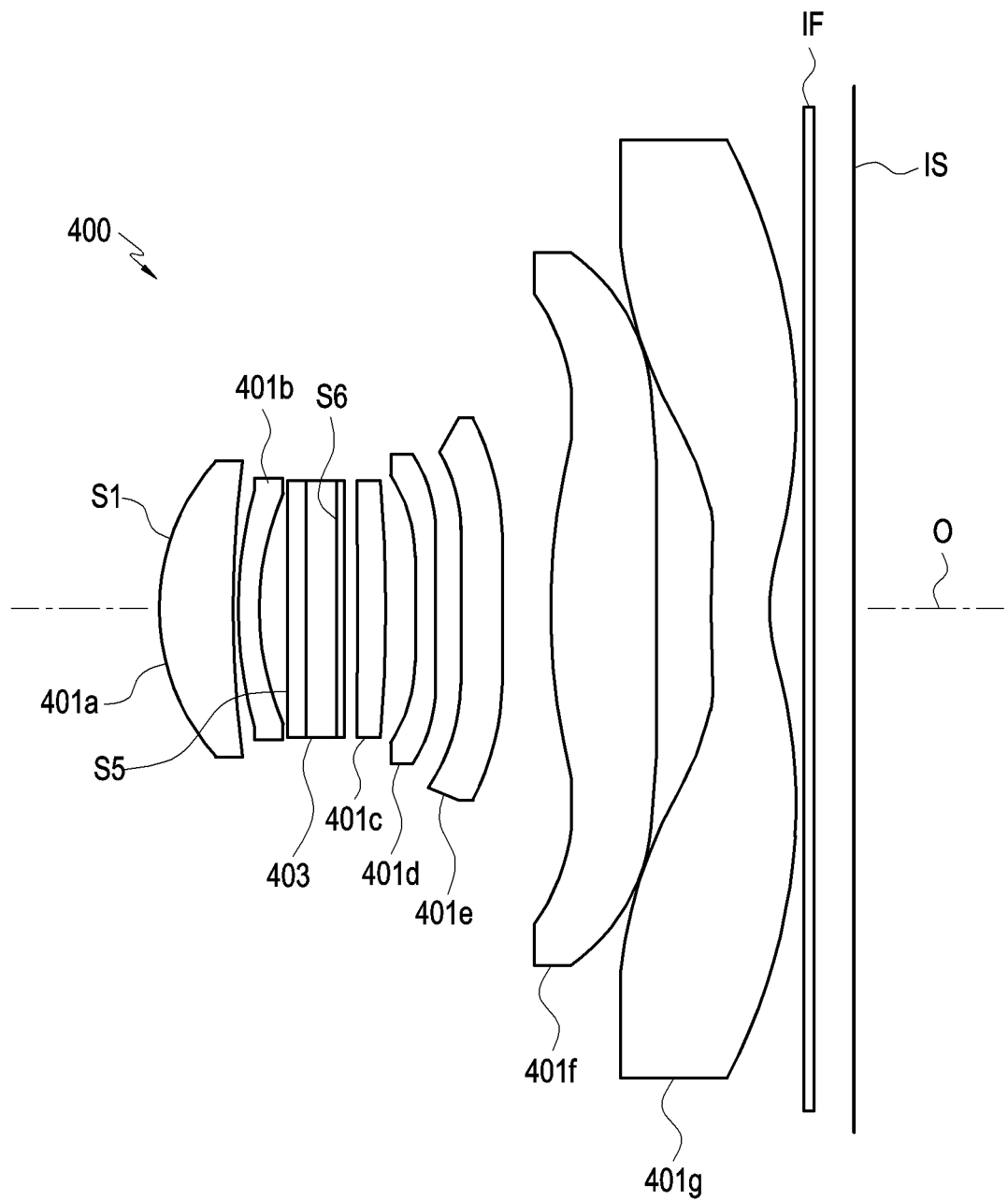
FIG. 4 is a view illustrating an array of lenses in a lens assembly according to certain embodiments disclosed herein.

FIG. 4 is a view illustrating a layout of lenses in a lens assembly 400 (e.g., the camera modules 105, 112, and 113 of FIG. 1 or FIG. 2) according to certain embodiments disclosed herein.

Referring to FIG. 4, the lens assembly 400 may include a plurality of (e.g., at least four) lenses 401a, 401b, 401c, 401d, 401e, 401f, and 401g sequentially arranged along an optical axis O from the object side to the sensor side, and a tunable lens 403 disposed between two lenses selected from among the plurality of lenses 401a, 401b, 401c, 401d, 401e, 401f, and 401g.

Unlike the plurality of lenses 401a, 401b, 401c, 401d, 401e, 401f, and 401g, the term "tunable lens" may refer to a lens in which at least one of a curved shape, power, curvature, and/or thickness can be changed. The plurality of lenses 401a, 401b, 401c, 401d, 401e, 401f, and 401g and/or the tunable lens 403 may be sequentially arranged along the optical axis O of an image sensor (e.g., a sensor surface IS). In the following detailed description, an ordinal number such as "first" or "second" may be written next to the term "lens" with respect to the lenses sequentially from the object side. For example, in the illustrated embodiment, the lens disposed first from the object side may be referred to as a "first lens 401a", and the tunable lens may be referred to as a "third lens 403". Although it is exemplified that the number of "plural lenses" is 7 in the illustrated embodiment, a lens not illustrated may be added or at least one of the illustrated lenses 401a, 401b, 401c, 401d, 401e, 401f, and 401g may be omitted. In some embodiments, when mounted in a miniaturized electronic device such as a smartphone, the lens assembly 400 may include at least four lenses and a tunable lens 403, and the tunable lens 403 may be disposed between two selected lenses selected from among the at least four lenses.

The lens disposed at the object-side front end (e.g., the first lens 401a) may have a convex object-side surface S1 and positive power. Since the first lens 401a has the positive power, the total length of the lens assembly 400 (e.g., the length from the sensor surface IS to the surface indicated by "S1") or the outer diameters of the lenses 401a, 401b, 401c, 401d, 401e, 401f, and 401g may be reduced. For example, the power of the first lens 401a may affect the size of the lens assembly 400. In some embodiments, since the object-side surface S1 of the first lens 401a is convex, the lens assembly 400 may have a wide-angle characteristic.

The third lens 403, for example, a tunable lens, may include a flat-shaped object-side surface S5 and a shape-changeable sensor-side surface S6. For example, when the shape of the sensor-side surface S6 of the third lens 403 is changed, the power or curvature of the third lens 403, or the thickness of the third lens 403 on the optical axis O is changeable. The structure and deformation operation of the third lens 403 (e.g., a tunable lens) will be described in more detail with reference to FIG. 6 and the like.

In some embodiments, the tunable lens 403 may be disposed at a position at which the height of marginal ray (e.g., the height H in FIG. 13) is the lowest. The "position at which the height of marginal ray is the lowest" may mean, for example, a position of an aperture (not illustrated). In another embodiment, depending on the configuration of the lenses 401a, 401b, 401c, 401d, 401e, 401f, and 401g or the arrangement of the aperture, the tunable lens 403 may be disposed adjacent to the aperture, or may be disposed adjacent to the lenses having the lowest height of marginal ray among the plurality of (e.g., at least four) lenses 401a, 401b, 401c, 401d, 401e, 401f, and 401g. In this embodiment, the "position at which the height of marginal ray is the lowest" may be located between the second lens 401b and the fourth lens 401c. Through this arrangement structure, it may be easy to miniaturize the tunable lens in the lens assembly 400, which will be described in more detail with reference to FIG. 13.

The power or shape of each of the second lens 401b and the fourth to eighth lenses 401c, 401d, 401e, 401f, and 401g may vary, and may be appropriately selected according to the specifications of a camera (e.g., the camera 500 in FIG. 5) or an electronic device (e.g., the electronic device 100 or 200 in FIGS. 1 to 3) in which the lens assembly 400 is to be disposed. In an embodiment, the lens assembly 400 may include an infrared filter IF disposed between the sensor surface IS and the eighth lens 401g, and the infrared filter IF may block incidence of light, which is out of the visible light area, on the sensor surface IS.

Figure 5:
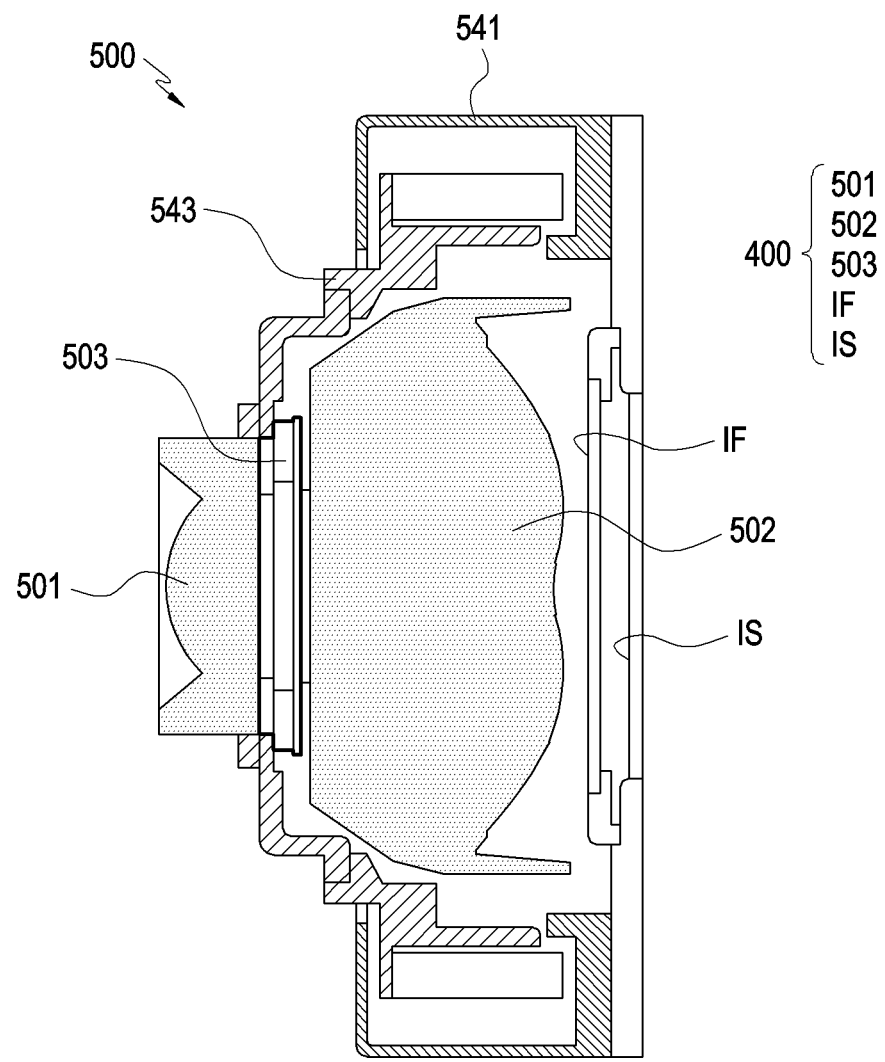
FIG. 5 is a cross-sectional configuration view illustrating a camera including a lens assembly according to certain embodiments disclosed herein.

FIG. 5 is a cross-sectional configuration view illustrating a camera 500 including a lens assembly (e.g., the lens assembly 400 in FIG. 4) according to certain embodiments disclosed herein.

In describing this embodiment, the lens assembly 400 is described as a component of the camera 500, but it is noted that certain embodiments disclosed herein are not limited thereto. For example, the lens assembly 400 itself may mean a camera, and the camera module 105, 112, or 113 of FIG. 1 or 2 may be one of the lens assembly 400 of FIG. 4 or the camera 500 of FIG. 5.

Referring to FIG. 5, a camera 500 may include a lens assembly (e.g., the lens assembly 400 in FIG. 4), a casing 541, and/or a barrel 543. The lens assembly 400 may include a first lens group 501, a second lens group 502, a tunable lens 503, an infrared filter IF, and/or an image sensor (e.g., the sensor surface IS).

Each of the first lens group 501 and the second lens group 502 may include at least one lens (e.g., the lenses 401a, 401b, 401c, 401d, 401e, 401f, and 401g in FIG. 4). The first lens group 501 may be disposed closer to the object side than the second lens group 502. In view of the embodiment of FIG. 4, the first lens group 501 may include a first lens 401a and a second lens 401b, and the second lens group 502 may include the fourth to eighth lenses 401c, 401d, 401e, 401f, and 401g. The tunable lens 503 is, for example, the third lens 403 in FIG. 4, and may be disposed at the object-side front end of the second lens group 502 (e.g., between the first lens group 501 and the second lens group 502).

The first lens group 501 and the second lens group 502 may be fixed in a barrel 543, and may be coupled to the infrared filter IF and/or the image sensor (e.g., the sensor surface IS) via the casing 541. Although not illustrated, the camera 500 may include a circuit board on which the image sensor is disposed, and a connection wire extending from the circuit board, and the connection wire may be electrically connected to a main circuit board (e.g., the printed circuit board 340 of FIG. 3) of the electronic device (e.g., the electronic device 100 or 200 in FIGS. 1 to 3).

In an embodiment, the first lens group 501, the second lens group 502, and/or the tunable lens 503 may be substantially fixed with respect to the infrared filter IF or the sensor surface IS. The deformation of the sensor-side surface (e.g., the surface indicated by "S6" in FIG. 4) of the tunable lens 503 changes the power or curvature of the tunable lens 503. Changing the power or curvature results in a focusing operation.

Figure 6:
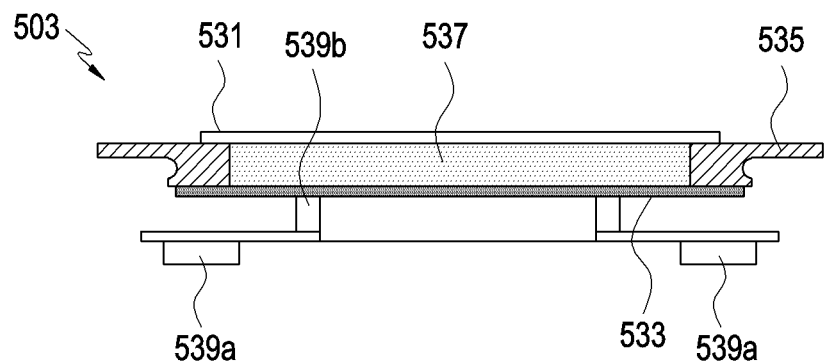
FIG. 6 is a cross-sectional configuration view illustrating a tunable lens of a lens assembly according to certain embodiments disclosed herein.

In describing this embodiment, it is noted that the object-side surface S5 and the sensor-side surface S6 of the tunable lens 503 are defined on the surfaces (e.g., outer surfaces of the transparent plate 531 and/or the polymer plate 533 in FIG. 6) seen as the appearance of the tunable lens 503. In certain embodiments disclosed herein, optical properties such as power of the tunable lens 503 may substantially vary depending on the refractive index and distribution of a medium (e.g., the medium 537 in FIGS. 6 to 8), and the object-side surface S5 and the sensor-side surface S6 may be defined in consideration of these characteristics of the tunable lens 503. For example, the object-side surface S5 of the tunable lens 503 may be defined as a surface in which the transparent plate 531 and the medium 537 of FIG. 6 are in contact with each other, and the sensor-side surface S6 of the tunable lens 503 may be defined as a surface in which the polymer plate 533 and the medium 537 of FIG. 6 are in contact with each other.

Figure 7:
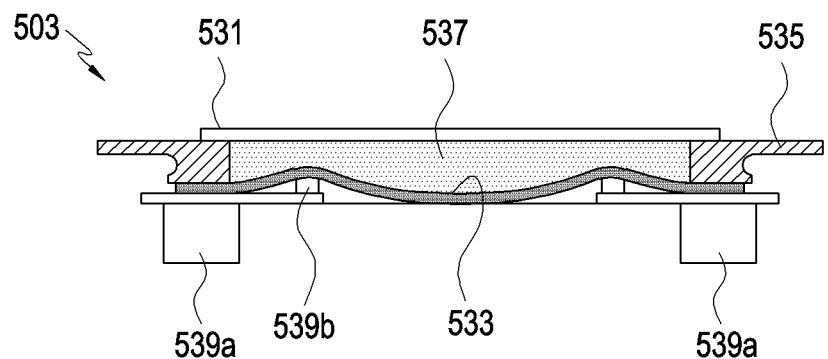
FIG. 7 is a cross-sectional configuration view illustrating a state in which a tunable lens of a lens assembly according to certain embodiments disclosed herein has positive power.
Figure 8:
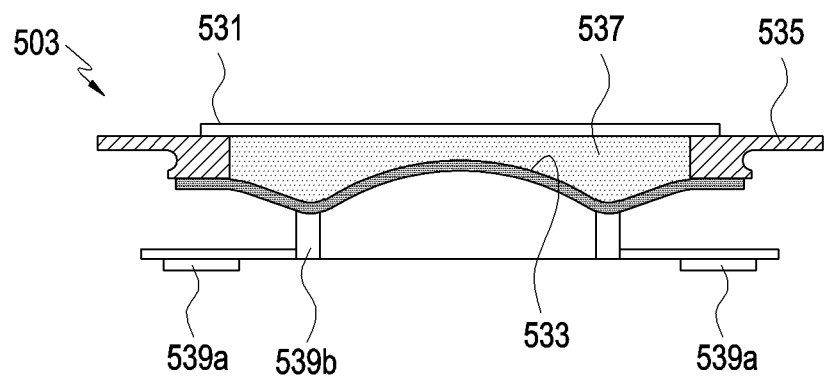
FIG. 8 is a cross-sectional configuration view illustrating a state in which a tunable lens of a lens assembly according to certain embodiments disclosed herein has negative power.
Figure 9:
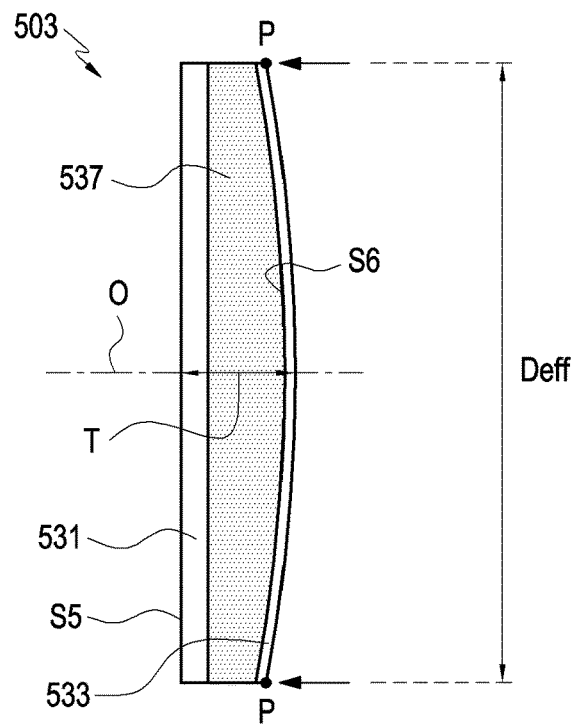
FIG. 9 is a view illustrating an operation of a tunable lens of a lens assembly according to certain embodiments disclosed herein.

FIG. 6 is a cross-sectional configuration view illustrating a tunable lens 503 of a lens assembly (e.g., the lens assembly 400 in FIG. 4 or the camera 500 in FIG. 5) according to certain embodiments disclosed herein. FIG. 7 is a cross-sectional configuration view illustrating a state in which the tunable lens 503 of the lens assembly (e.g., the lens assembly 400 in FIG. 4 or the camera 500 in FIG. 5) according to certain embodiments disclosed herein has positive power. FIG. 8 is a cross-sectional configuration view illustrating a state in which the tunable lens 503 of the lens assembly (e.g., the lens assembly 400 in FIG. 4 or the camera 500 in FIG. 5) according to certain embodiments disclosed herein has negative power. FIG. 9 is a view illustrating an operation of a tunable lens 603 (e.g., the tunable lens 403 or 503 in FIGS. 4 to 8) of a lens assembly (e.g., the lens assembly 400 in FIG. 4 or the camera 500 in FIG. 5) according to certain embodiments disclosed herein.

Referring to FIGS. 6 to 9, the tunable lens 503 may include a transparent plate 531, a polymer plate 533 having a changeable curvature, a sealing member 535 coupling the transparent plate 531 and the polymer plate 533 to each other, and/or a medium 537 accommodated in the space between the transparent plate 531 and the polymer plate 533.

The transparent plate 531 may be, for example, a planar lens made of glass or plastic material and having no power. In another embodiment, the transparent plate 531 may have positive or negative power. For example, in this embodiment, the transparent plate 531 is exemplified as a planar lens for the sake of brevity of description, but the transparent plate 531 may be implemented as a lens having power or curvature like a plurality of other lenses (e.g., the lenses 401a, 401b, 401c, 401d, 401e, 401f, and 401g in FIG. 4). The polymer plate 533 is a membrane, sheet, or film the shape (e.g., curvature) of which is changeable in response to an external force, and may substantially transmit light and refract at least a part of the light passing therethrough depending on the curvature thereof. In an embodiment, the thickness T (e.g., the thickness on the optical axis O of FIG. 4) or power of the tunable lens 503 is changeable depending on the shape change of the polymer plate 533. In another embodiment, the "thickness change of the tunable lens 503" may mean a change in curvature of the tunable lens 503. In some embodiments, the tunable lens 503 may be modified to have positive power, power of zero, or negative power.

According to certain embodiments, the polymer plate 533 may be coupled to face the transparent plate 531 by the sealing member 535, and the sealing member 535 may seal the space between the polymer plate 533 and the transparent plate 531 in the state in which the medium 537 is injected into the space. The medium 537 is, for example, a liquid state or gel state material having a specified refractive index, and may change the thickness T of the tunable lens 503 (e.g., the thickness in the optical axis O direction) while moving in the internal space of the tunable lens 503 when an external force is applied to the polymer plate 533. In an embodiment, the transparent plate 531 may be disposed as the object-side surface (e.g., the surface indicated by "S5" in FIG. 4), and the polymer plate 533 may be disposed as the sensor-side surface (e.g., the surface indicated by "S6" in FIG. 4). However, it is noted that the certain embodiments disclosed herein are not limited thereto, and the transparent plate 531 may be disposed as the sensor-side surface.

According to certain embodiments, the medium 537 may have a higher refractive index than air. For example, with respect to another medium distributed in the external space around the tunable lens 503, the medium 537 may have a refractive index satisfying Equation 1 below:

$$1.25 \le n1/n2 \le 1.7 \qquad \text{[Equation 1]}$$

where "n1" may mean a refractive index of the medium 537, and "n2" may mean a refractive index of another medium distributed in the external space around the tunable lens 503. In an embodiment, when the other medium distributed in the external space is air, the refractive index of the medium 537 may be approximately 1.25 or more and 1.7 or less.

A lens assembly or camera (e.g., the lens assembly 400 or the camera 500 in FIGS. 4 and 5) may further include a pressing member 539b and/or an actuator 539a configured to press the tunable lens 503, e.g., the polymer plate 533. The pressing member 539b may be disposed in contact with the sensor-side surface (e.g., the polymer plate 533) of the tunable lens 503, and may press or pull the polymer plate 533 in response to the operation of the actuator 539a. The pressing member 539b may have a ring shape or a cylinder shape centered on the optical axis O, and may be disposed in contact with the polymer plate 533. In an embodiment, when the sealing member 535 is an elastic body that is contractible or expandable by an external force or is made of a deformable material, the pressing member 539b may be disposed in contact with an edge of the polymer plate 533 (e.g., the point indicated by "P" in FIG. 9).

According to certain embodiments, the actuator 539a may move the pressing member 539b forward and backward in the optical axis (e.g., the optical axis O in FIG. 4) direction, and may include a piezoelectric actuator or a motor. In a default state, as illustrated in FIG. 6, the polymer plate 533 may have a substantially flat plate shape, and may be disposed in parallel to the transparent plate 531. In some embodiments, in a state in which the polymer plate 533 and the transparent plate 531 are parallel to each other, the tunable lens 503 may have power of 0 (zero). When the pressing member 539b presses the polymer plate 533 by the driving of the actuator 539a, at least a portion of the polymer plate 533 may move in the optical axis O direction to be closer to the transparent plate 531 at the contact point, as illustrated in FIG. 7. For example, since at least a portion of the polymer plate 533 is deformed, the curvature of the polymer plate 533 may be changed in the pressurized state to be different from that in the default state (e.g., the state illustrated in FIG. 6). By the pressing of the pressing member 539b, the sensor-side surface of the tunable lens 503 (e.g., the surface indicated by "S6" in FIG. 4) may become convex toward the sensor side, and the tunable lens 503 may have positive power. In another embodiment, due to the pressing, the distance between the polymer plate 533 and the transparent plate 531 may be reduced at the contact point, and the medium 537 may move in the tunable lens 503 to the central portion of the polymer plate 533 (e.g., the area located on the optical axis O in FIG. 4) so that the central portion of the polymer plate 533 may be further away from the transparent plate 531 than in the default state. For example, in the pressed state, since the lens thickness T on the optical axis O becomes larger than that in the default state and the thickness at the contact point becomes smaller, the tunable lens 503 may have positive power.

According to certain embodiments, when the pressing member 539b pulls the polymer plate 533 by the driving of the actuator 539a, as illustrated in FIG. 8, at least a portion of the polymer plate 533 (e.g., the portion in contact with the pressing member 539b) may be deformed to move away from the transparent plate 531. For example, in the pulled state, the curvature of the polymer plate 533 may be changed to be different from that in the default state or the pressed state. According to an embodiment, by being pulled, the medium 537 may move into the space around the contact point, and in the central portion (e.g., the point at which the optical axis O in FIG. 4 is located), the polymer plate 533 may be closer to the transparent plate 531 than in the default state. For example, in the pulled state, the tunable lens 503 may have negative power while the lens thickness T on the optical axis O becomes smaller than that in the default state.

In this way, the change in thickness of the tunable lens 503 at the contact point between the polymer plate 533 and the pressing member 539b may be inversely proportional to the change in the thickness T of the tunable lens 503 on the optical axis O. According to an embodiment, in the tunable lens 503, between the pulled state and the pressed state, the thickness T on the optical axis O may gradually increase, and the power may increase in proportion to the lens thickness T. In some embodiments, since the power or curvature may be changed in response to an external force applied to the polymer plate 533, the tunable lens 503 may implement a focusing operation even when the lens assembly 400 (e.g., the lenses 401a, 401b, 401c, 401d, 401e, 401f, and 401g in FIG. 4) does not move forward and backward. For example, the electronic device (e.g., the electronic device 100 or 200 of FIGS. 1 to 3) or the processor of the electronic device may be configured to perform the focusing operation by adjusting the power or curvature of the tunable lens 503. In the embodiment of FIGS. 6 to 8, it is noted that the contact point between the pressing member 539b and the polymer plate 533 is an example to more clearly illustrate the deformation of the polymer plate 533, and the contact point is not intended to limit the certain embodiments disclosed herein. For example, as described above, depending on whether or not the sealing member 535 is deformable or the coupling structure between the sealing member 535 and the polymer plate 533, the pressing member 539b may come into contact with an edge of the polymer plate 533 (e.g., the point indicated by "P" in FIG. 9).

According to certain embodiments, the effective diameter Deff of the tunable lens 503 may be determined by the point at which the pressing member 539b comes into contact with the polymer plate 533. For example, when the pressing member 539b is provided as an opaque mechanical structure, an area through which light can pass through the tunable lens 503 may be substantially set by the pressing member 539b. In some embodiments, when the pressing member 539b does not interfere with or come into contact with the light-transmitting area of the tunable lens 503, the effective diameter Deff of the tunable lens 503 may be substantially equal to the diameter of the transparent plate 531 or the polymer plate 533. In an embodiment, when the lens assembly or the camera (e.g., the lens assembly 400 in FIG. 4 or the camera 500 in FIG. 5) is mounted in a miniaturized electronic device such as a smartphone (e.g., the electronic device 100 or 200 in FIGS. 1 to 3), the tunable lens 503 may have an effective diameter Deff that satisfies Equation 2 below:

$$1.0 \text{ mm} \leq \text{Deff} \leq 7.0 \text{ mm} \quad [\text{Equation 2}]$$

Figure 10:
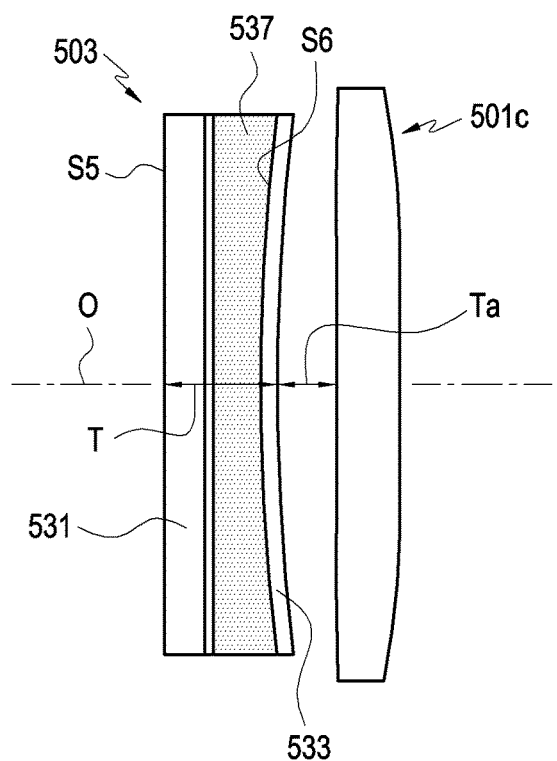
FIGS. 10 to 12 are views for describing a change in thickness or air gap according to an operation of a tunable lens in a lens assembly according to certain embodiments disclosed herein.
Figure 11:
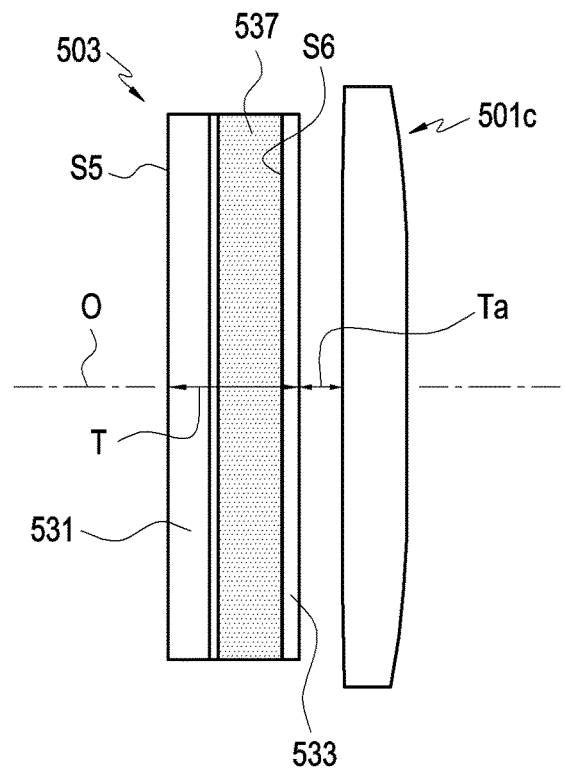
Figure 12:
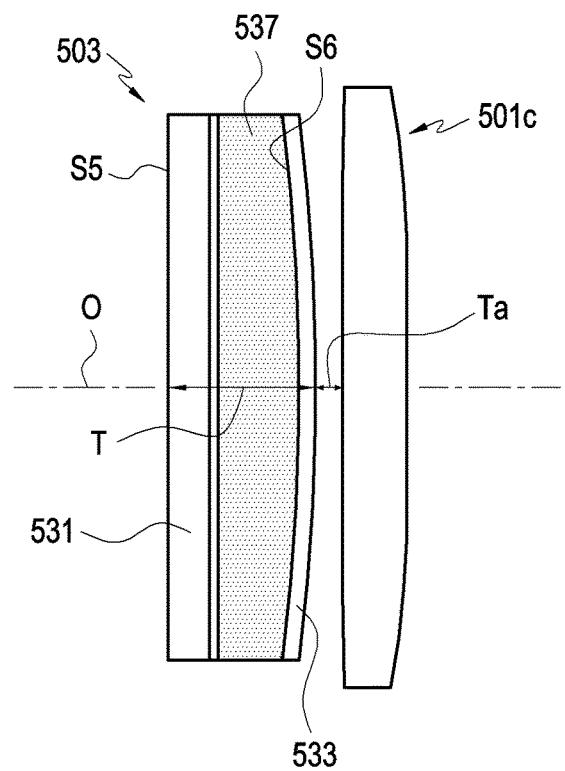

FIGS. 10 to 12 are views for describing a change in thickness T or an air gap Ta according to the operation of the tunable lens 503 in a lens assembly (e.g., the lens assembly 400 in FIG. 4 or the camera 500 in FIG. 5) according to certain embodiments disclosed herein.

Referring to FIGS. 10 to 12, according to the deformation of the tunable lens 503 or the polymer plate 533, the air gap with another adjacent lens 501c may vary. Here, the "another adjacent lens" may mean a lens facing the polymer plate 533, and will be referred to as a "fourth lens 501c" below with reference to the embodiment of FIG. 4. FIG. 10 illustrates a state in which the tunable lens 503 has negative power, FIG. 11 illustrates that the tunable lens 503 is in a default state (e.g., the state in which the power is 0), and FIG. 12 illustrates a state in which the tunable lens 503 has positive power. According to an embodiment, on the optical axis O, the sum of the thickness T of the tunable lens 503 and the air gap Ta (e.g., the air gap between the tunable lens 503 and the fourth lens 501c) may be constant, and the thickness T of the tunable lens 503 and the air gap Ta may be inversely proportional to each other. In some embodiments, according to the power of the tunable lens 503, the lens assembly (e.g., the lens assembly 400 in FIG. 4 or the camera 500 in FIG. 5) may satisfy Equation 3 below.

$$Tn/Tan < T0 Ta0 < Tp/Tap \qquad \text{[Equation 3]}$$

where "Tn" may represent the thickness T of the tunable lens 503 on the optical axis O when the tunable lens 503 has negative power, "T0" may represent the thickness T of the tunable lens 503 when the power of the tunable lens 503 is 0 (zero), "Tp" may represent the thickness T of the tunable lens 503 when the tunable lens 503 has positive power, "Tan" may represent the air gap Ta between the tunable lens 503 and the lens (e.g., the fourth lens 501c) facing the polymer plate 533 on the optical axis O when the tunable lens 503 has negative power, "Ta0" may represent the air gap Ta between the fourth lens 501c and the tunable lens 503 when the power of the tunable lens 503 is 0 (zero), and "Tap" may mean the air gap Ta between the fourth lens 501c and the tunable lens 503 when the tunable lens 503 has positive power.

According to certain embodiments, by using the actuator 539a and/or the pressing member 539b, the power or curvature of the tunable lens 503 can be adjusted even if an electrical signal is not directly applied to the tunable lens 503 itself. Thus, the focusing operation can be implemented even if the lens assembly (e.g., the lens assembly 400 in FIG. 4 or the camera 500 in FIG. 5) does not move forward or backward. For example, since there is no need to secure a separate space for forward and backward movement while implementing a focusing operation, the lens assembly 400, the camera 500, and/or an electronic device including the same can be miniaturized while ensuring good quality of a captured image or video. According to an embodiment, a difference in refractive index between the medium 537 of the tunable lens 503 and another medium in the external space (e.g., a medium distributed in the air gap Ta in FIG. 10) (e.g., the refractive indices of media that satisfy Equation 1 above) may induce a large change in power even with a small deformation of the polymer plate 533. For example, even if the range in which the pressing member 539b moves forward and backward is small, the power of the tunable lens 503 is changeable in a considerable range. Accordingly, even when there is no forward and backward movement in the optical axis O direction in the lens assembly 400, a focusing operation required in the camera (e.g., the camera 500 in FIG. 5) or the electronic device (e.g., the electronic device 100 or 200 in FIGS. 1 to 3) can be implemented.

Figure 13:
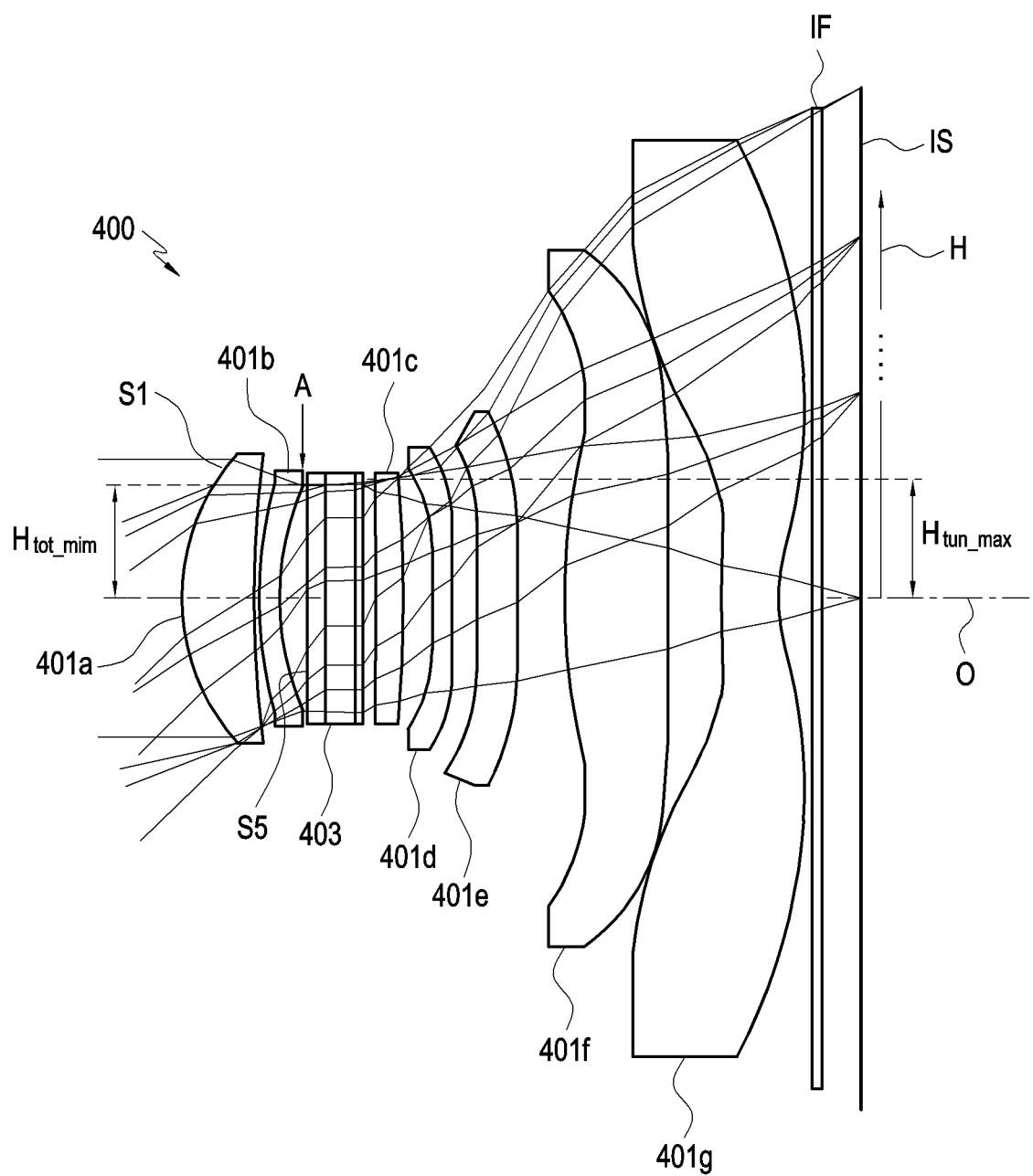
FIG. 13 is a view for describing an arrangement of a tunable lens in a lens assembly according to certain embodiments disclosed herein.

FIG. 13 is a view for explaining the arrangement of the tunable lens 403 (e.g., the tunable lens 503 in FIGS. 6 to 12) in the lens assembly 400 according to certain embodiments disclosed herein.

FIG. 13 illustrates paths of light beams incident on the lens assembly 400 of FIG. 4, in which "H" may mean the height of a light beam or a marginal ray from the optical axis O. According to an embodiment, as the tunable lens 403 is closer to a point at the minimum height of marginal ray according to the entire lens arrangement (hereinafter, the "minimum height of total marginal ray Htot_min" or the "first height"), for example, the point indicated by "A", it may be easier to miniaturize the tunable lens 403. In an embodiment, the maximum height of marginal ray Htun_max (hereinafter, the "second height") of the tunable lens 403 may be greater than or equal to the minimum height of entire marginal ray Htot_min. According to an embodiment, the point "A", at which the height of total marginal ray is the minimum Htot_min, may be a point at which an aperture is disposed, for example, an aperture stop.

According to certain embodiments, the tunable lens 403 may be configured to make all incident rays incident thereon. For example, the tunable lens 503 may be designed such that, when the tunable lens 503 is disposed at point "A", the maximum height of marginal ray Htun_max of the tunable lens 503 is equal to the minimum height of total marginal ray Htot_min. When disposed at another position, for example, between the seventh lens 401f and the eighth lens 401g, the second height Htun_max of the tunable lens 403 (e.g., the maximum height of marginal ray of the tunable lens 403) may be approximately three times the first height Htot_min. In certain embodiments disclosed herein, as the distance from the point indicated by "A" increases, the maximum height of total marginal ray Htun_max of the tunable lens 403 may increase, and the tunable lens 403 may have the maximum height of marginal ray Htun_max that satisfies Equation 4 below:

$$1.0 \leq (H\text{tun}_{max})/(H\text{tot}_{min}) \leq 3.0 \qquad \text{[Equation 4]}$$

According to certain embodiments, the maximum height of marginal ray Htun_max of the tunable lens 403 may be equal to the first height Htot_min when the tunable lens 403 is disposed at the point "A", and for example, as the distance from the point "A" increases, the size of the tunable lens 403 (e.g., the effective diameter Deff in FIG. 9) may increase. In some embodiments, since the tunable lens 403 is disposed between two adjacent lens, the tunable lens may have the maximum height of marginal ray greater than that of the object-side lens (e.g., the second lens in the embodiment of FIG. 4) and smaller than that of the sensor-side lens (e.g., the fourth lens 401c in the embodiment of FIG. 4).

Further referring to FIGS. 6 to 9 again, as the size of the tunable lens 403 or 503 decrease, the deformation (e.g., the degree of change in curvature) of the polymer plate 533 compared to the amount of movement of the pressing member 539b may increase. The actuator 539a may receive power or an electrical signal to move the pressing member 539b or to deform the polymer plate 533. For example, as the size or effective diameter of the tunable lens 403 or 503 increases, more power may be consumed to change the power or curvature of the tunable lens 403 or 503. According to certain embodiments disclosed herein, the tunable lens 403 or 503 may be disposed at a point at which the height of marginal ray H is the lowest in the entire lens array (e.g., the point "A" in FIG. 13), disposed adjacent to an aperture when the lens assembly 400 includes the aperture, and/or disposed adjacent to a lens having the lowest height of marginal ray H among the lenses 401a, 401b, 401c, 401d, 401e, 401f, and 401g. For example, in the lens assembly 400, when the tunable lens 403 or 503 is disposed at or adjacent to the point at which the height of marginal ray H is the lowest, the tunable lens 403 or 503 can be miniaturized and the power consumed in the focusing operation can be reduced.

Figure 14:
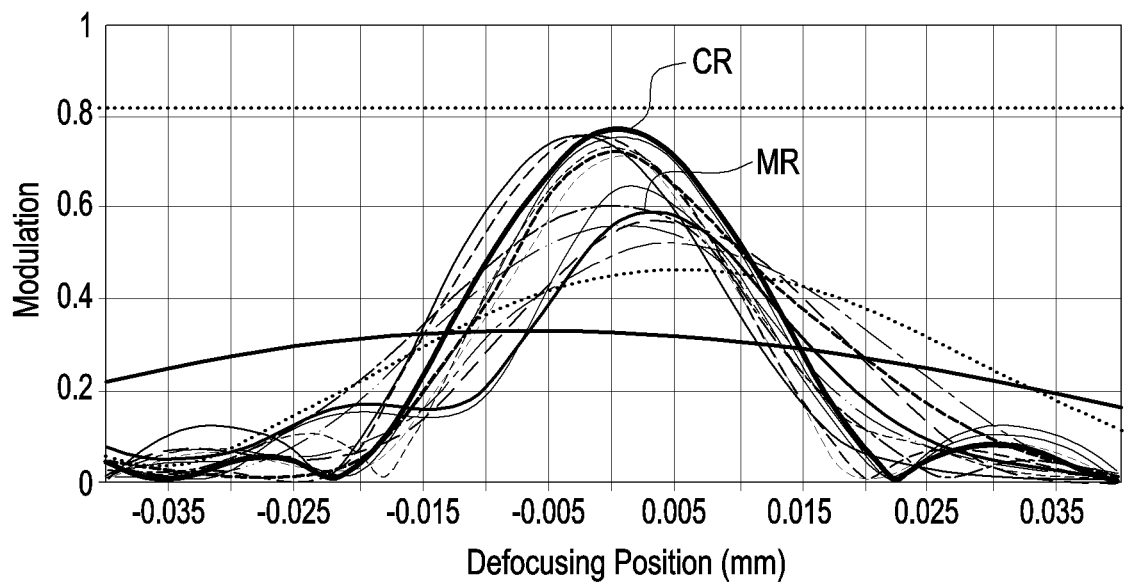
FIG. 14 is a graph of a modulation transfer function (MTF) representing the resolution of a lens assembly according to certain embodiments disclosed herein when a subject at a distance of approximately 1 m is imaged.
Figure 15:
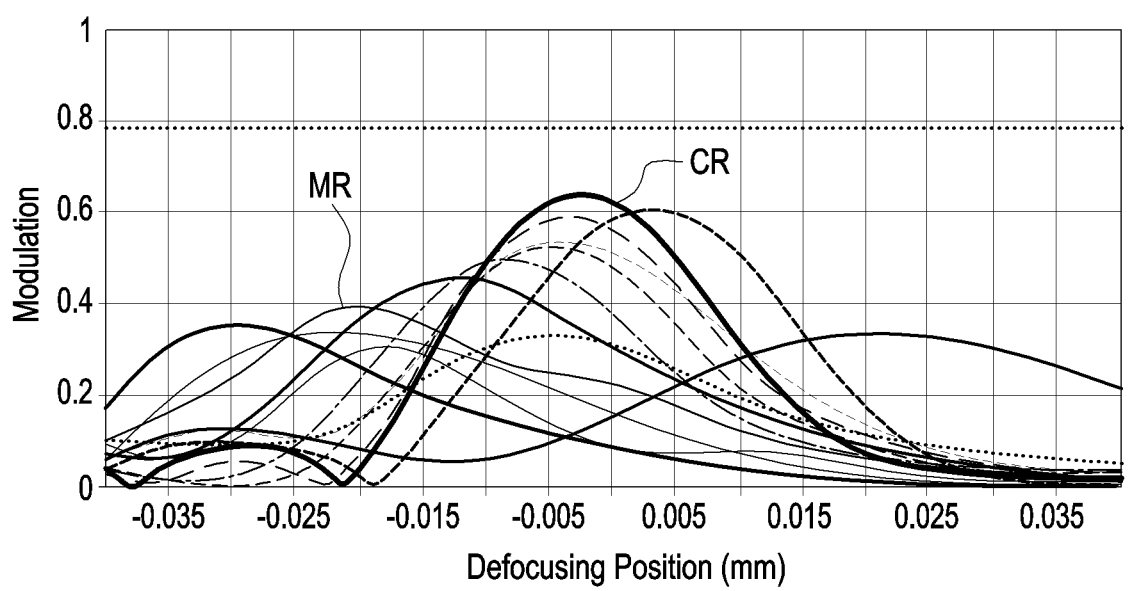
FIG. 15 is a graph of a modulation transfer function representing the resolution of a lens assembly according to certain embodiments disclosed herein when a subject at a distance of approximately 30 cm is imaged in a state in which the tunable lens is not operated.
Figure 16:
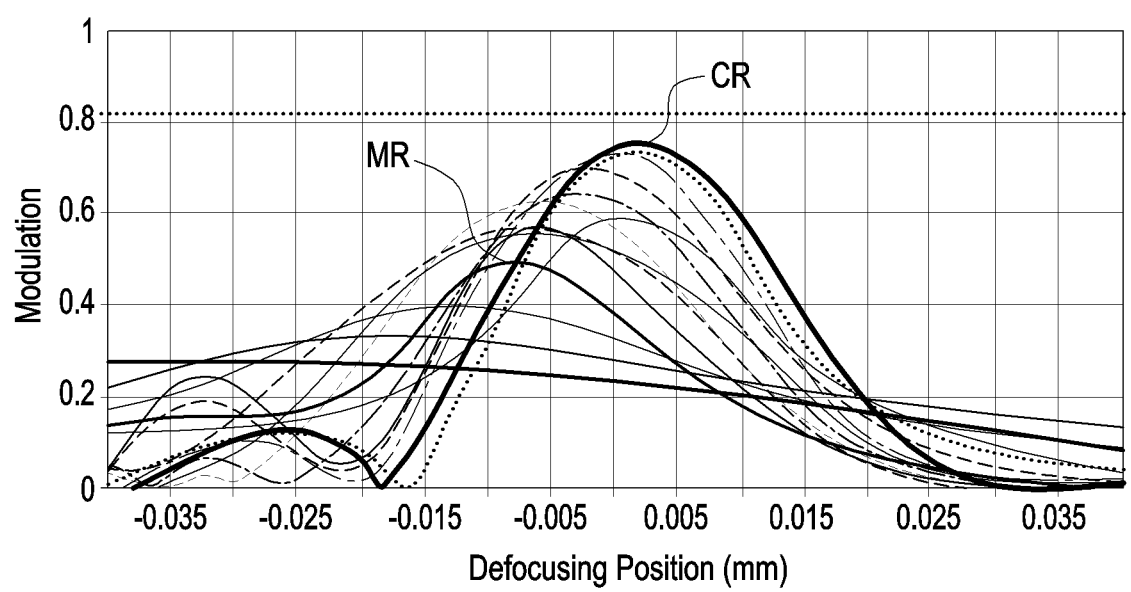
FIG. 16 is a graph of a modulation transfer function representing the resolution of a lens assembly according to certain embodiments disclosed herein when a subject at a distance of approximately 30 cm is imaged in a state in which the tunable lens is operated.

FIGS. 14 to 16 are graphs of a modulation transfer function (MTF) representing the resolution of a lens assembly (e.g., the lens assembly 400 in FIG. 4 or FIG. 13) when a subject at a specified distance is imaged, in which the horizontal axis may represent a defocusing position, that is a distance or deviation between a sensor surface IS and a focal position on the optical axis O, and a vertical axis may represent modulation.

FIG. 14 is a graph of a modulation transfer function (MTF) illustrating the resolution of a lens assembly (e.g., the lens assembly 400 of FIG. 4 or FIG. 13) according to certain embodiments disclosed herein when a subject at a distance of approximately 1 m is imaged.

Referring to FIG. 14, when a subject at a distance of approximately 1 m or more is imaged, the central ray CR and the marginal ray MR in the lens assembly 400 may be substantially aligned without a deviation of focus. According to an embodiment, when the lens assembly has the total lens length (e.g., the length between the surface indicated by "S1" in FIG. 4 and the sensor surface IS) of about 7.83 mm, a field of view of about 82.34 degrees, and an F-number of 1.90, the lens assembly 400 may have the modulation transfer function characteristic of FIG. 14. In this embodiment, the distance that can be aligned without a deviation of focus is referred to as "about 1 m or more", but it is noted that certain embodiments disclosed herein are not limited thereto and this exemplifies a general setting in a miniaturized electronic device such as a smartphone. According to an embodiment, when a subject within a specified distance (e.g., about 1 m) is imaged in a state in which a focusing operation is not implemented, a distortion phenomenon such as field curvature may occur.

FIG. 15 is a graph of a modulation transfer function (MTF) illustrating the resolution of a lens assembly (e.g., the lens assembly 400 of FIG. 4 or FIG. 13) according to certain embodiments disclosed herein when a subject at a distance of about 30 cm is imaged in a state in which the tunable lens does not operate.

Referring to FIG. 15, it can be seen that, when a subject at a distance of about 30 cm is imaged in a state in which the focusing operation is not implemented, the focus is deviated by about 0.02 mm between the central ray CR and the marginal ray MR in the lens assembly 400. A deviation in focus occurring between the central ray CR and the marginal ray MR is referred to as "field curvature", and the field curvature phenomenon may increase when the distance between the lens assembly 400 and the subject becomes closer, when the lens assembly 400 is smaller, or when the number of lenses of the lens assembly 400 decreases. This field curvature phenomenon may be generally alleviated or eliminated through focusing by the forward/backward movement of the lens assembly 400. According to certain embodiments disclosed herein, the lens assembly 400 may use a change in power or curvature of the tunable lenses 403 and 503 to perform focusing and/or suppress the field curvature phenomenon. Thus, since the lens assembly 400 does not substantially move forward and backward, it may be easy to mount the lens assembly in a miniaturized electronic device. This will be further described with reference to FIG. 16.

FIG. 16 is a graph of a modulation transfer function (MTF) illustrating the resolution of a lens assembly (e.g., the lens assembly 400 of FIG. 4 or FIG. 13) according to certain embodiments disclosed herein when a subject at a distance of about 30 cm is imaged in a state in which the tunable lens operates.

Referring further to FIG. 16, when a subject at a distance of about 30 cm is imaged, the lens assembly 400 according to certain embodiments disclosed herein may perform focusing even if the lenses 401a, 401b, 401c, 401d, 401e, 401f, and 401g do not move forward or backward with respect to the sensor surface IS. According to an embodiment, when a subject at a close distance of about 30 cm is imaged while the total length of the lens (e.g., the length between the surface indicated by "S1" in FIG. 4 and the sensor surface IS) is maintained at about 7.83 mm, a focal deviation between the central ray CR and the marginal ray MR may be about 0.01 mm. For example, compared with the graph of the modulation transfer function of FIG. 15, when the tunable lens 403 or 503 perform focusing, the lens assembly 400 according to certain embodiments disclosed herein may be improved by about 50% in focal deviation. As a result, the lens assembly 400 or the camera 500 according to certain embodiments may make it possible to acquire a good captured image or video while contributing to miniaturization of an electronic device.

As described above, according to certain embodiments disclosed herein, a lens assembly (e.g., the camera modules 105, 112, and 113 in FIGS. 1 and 2, the lens assembly 400 in FIG. 4, or the camera 500 in FIG. 5) may be easily mounted in a miniaturized electronic device (e.g., the electronic device 100 or 200 in FIGS. 1 to 3), or may contribute to miniaturization of an electronic device. In an embodiment, the lens assembly may implement a focusing operation using a tunable lens (e.g., the third lens or the tunable lens 403 in 503 of FIGS. 4 to 13), thereby making it possible to obtain an image or video of good quality while making the appearance of a miniaturized electronic device beautiful. In other embodiments, the tunable lens may be miniaturized by being placed at or adjacent to a point (e.g., the point indicated by "A" in FIG. 13) that is the minimum height of marginal ray throughout the lens assembly. For example, the lens assembly is able to perform focusing with little power and contribute to improving power efficiency of a miniaturized electronic device.

According to certain embodiments disclosed herein, a lens assembly (e.g., the camera module 105, 112, or 113 in FIGS. 1 and 2, the lens assembly 400 in FIG. 4, or the camera 500 in FIG. 5) and/or an electronic device (e.g., the electronic device 100 or 200 in FIGS. 1 to 3) including the same may include at least four lenses (e.g., the lenses 401a, 401b, 401c, 401d, 401e, 401f, and 401g of FIG. 4 or FIG. 13) which are sequentially arranged along an optical axis (e.g., the optical axis O in FIG. 4 or FIG. 13) from an object side to a sensor side, and a tunable lens (e.g., the third lens or tunable lens 403 or 503 in FIGS. 4 to 13) disposed between two lenses selected from among the at least four lenses (e.g., the second lens 401b and the fourth lens 401c in FIG. 4 or FIG. 13) and configured such that power or curvature thereof can be changed, wherein the lens assembly may satisfy Conditional Expression 1 below:

$$1.0 = <(H\text{tun\_max})/(H\text{tot\_min}) = <3.0 \quad \text{[Conditional Expression 1]}$$

where "Htun_max" represents the maximum height of marginal ray of the tunable lens (e.g., the second height (Htun_max) in FIG. 13), and "Htot_min" represents the minimum height of marginal ray of the entire lens assembly (e.g., the first height (Htot_min) in FIG. 13).

According to certain embodiments, among the at least four lenses, the first lens (e.g., the first lens 401a in FIG. 4 or FIG. 13) disposed on the object side may have a convex object-side surface (e.g., the surface indicated by "S1" in FIG. 4) and have positive power.

According to certain embodiments, the tunable lens may have an effective diameter Deff (e.g., the effective diameter Deff in FIG. 9) that satisfies Conditional Expression 2 below:

$$1 \text{ mm} = <\text{Deff} = <7.0 \text{ mm} \quad \text{[Conditional Expression 2]}$$

According to certain embodiments, the tunable lens may include a transparent plate (e.g., the transparent plate 531 of FIGS. 6 to 12) disposed as an object-side surface (e.g., a surface indicated by "S5" in FIG. 4 or FIG. 9) or a sensor-side surface (e.g., the surface indicated by "S6" in FIG. 4 or FIG. 9), a polymer plate (e.g., the polymer plate 533 in FIGS. 6 to 12) disposed to face the transparent plate and having a changeable curvature, a sealing member (e.g., the sealing member 535 in FIGS. 6 to 8) coupling the transparent plate and the polymer plate to each other, and sealing a space between the transparent plate and the polymer plate, and a liquid or gel medium (e.g., the medium 537 in FIGS. 6 to 12) accommodated in the space between the transparent plate and the polymer plate, wherein the tunable lens may be configured to have positive power, power of 0 (zero), or negative power depending on the curvature of the polymer plate.

According to certain embodiments, the polymer plate may be configured deform in response to an external force, thereby changing the thickness of the tunable lens at least on the optical axis.

According to certain embodiments, the lens assembly described above may further include a pressing member (e.g., the pressing member 539b in FIGS. 6 to 8) configured to come into contact with the polymer plate, the pressing member having a ring-shape, and an actuator (e.g., the actuator 539a in FIGS. 6 to 8) configured to move the pressing member forward and backward in the optical axis direction, wherein the pressing member may be configured to move at least a portion of the polymer plate along the optical axis in response to the operation of the actuator.

According to certain embodiments, the polymer plate to partially move or deform by the pressing member thereby changing a thickness of the tunable lens, such that the thickness change of the tunable lens at a point where the polymer plate and the pressing member are in contact with each other (e.g., the points indicated by "P" in FIG. 9) may be inversely proportional to a thickness change of the tunable lens on the optical axis.

According to certain embodiments, the medium may have a refractive index that satisfies Conditional Expression 3 below:

$$1.25 =< n1/n2 =< 1.7 \quad \text{[Conditional Expression 3]}$$

where "n1" represents the refractive index of the medium, and "n2" represents a refractive index of another medium distributed in an outer space around the tunable lens.

According to certain embodiments, depending on the power of the tunable lens, a thickness of the tunable lens may be changed to satisfy Conditional Expression 4 below:

$$Tn < T0 < Tp, \quad \text{[Conditional Expression 4]}$$

where "Tn" represents the thickness of the tunable lens on the optical axis when the tunable lens has negative power, "T0" represents the thickness of the tunable lens on the optical axis when the tunable lens has a power of 0 (zero), and "Tp" represents the thickness of the tunable lens on the optical axis when the tunable lens has positive power.

According to certain embodiments, depending on the power of the tunable lens, the thickness of the tunable lens (e.g., the thickness T in FIGS. 10 to 12) and an air gap (e.g., the air gap Ta in FIGS. 10 to 12) are changed to satisfy Conditional Expression 5 below:

$$Tn/Tan < T0/Ta0 < Tp/Tap \quad \text{[Conditional Expression 5]}$$

where "Tn" represents the thickness of the tunable lens on the optical axis when the tunable lens has negative power, "T0" represents the thickness of the tunable lens on the optical axis when the tunable lens has a power of 0 (zero), and "Tp" represents the thickness of the tunable lens on the optical axis when the tunable lens has positive power, "Tan" represents the air gap between the tunable lens and a lens facing the polymer plate among the at least four lenses on the optical axis when the tunable lens have negative power, "Ta0" represents the air gap between the tunable lens and the lens facing the polymer plate among the at least four lenses when the tunable lens has power of 0 (zero), and "Tap" represents the air gap between the tunable lens and the lens facing the polymer plate among the at least four lenses when the tunable lens has positive power.

According to certain embodiment, the tunable lens may be disposed adjacent to a lens having the lowest peripheral ray height (e.g., the second lens 401b or the point indicated by "A" in FIG. 13) among the at least four lenses.

According to certain embodiments disclosed herein, a lens assembly (e.g., the camera module 105, 112, or 113 in FIGS. 1 and 2, the lens assembly 400 in FIG. 4, or the camera 500 in FIG. 5) and/or an electronic device (e.g., the electronic device 100 or 200 in FIGS. 1 to 3) including the same may include at least four lenses (e.g., the lenses 401a, 401b, 401c, 401d, 401e, 401f, and 401g of FIG. 4 or FIG. 13) which are sequentially arranged along an optical axis (e.g., the optical axis O in FIG. 4 or FIG. 13) from an object side to a sensor side, and a tunable lens (e.g., the third lens or tunable lens 403 or 503 in FIGS. 4 to 13) disposed between two lenses selected from among the at least four lenses and configured such that thereof can be changed, wherein the tunable lens may include a transparent plate (e.g., the transparent plate 531 of FIGS. 6 to 12) disposed as an object-side surface (e.g., a surface indicated by "S5" in FIG. 4 or FIG. 9) or a sensor-side surface (e.g., the surface indicated by "S6" in FIG. 4 or FIG. 9), a polymer plate (e.g., the polymer plate 533 in FIGS. 6 to 12) disposed to face the transparent plate and having a changeable curvature, a sealing member (e.g., the sealing member 535 in FIGS. 6 to 8) coupling the transparent plate and the polymer plate to each other, and sealing a space between the transparent plate and the polymer plate, and a liquid state or gel state medium (e.g., the medium 537 in FIGS. 6 to 12) accommodated in the space between the transparent plate and the polymer plate, wherein the liquid state or gel state medium may have a refractive index n1 that satisfies Conditional Expression 7 below:

$$1.25 =< n1 =< 1.7 \quad \text{[Conditional Expression 7]}$$

According to certain embodiment, the tunable lens may have an effective diameter Deff, that satisfies Conditional Expression 8 below:

$$1 \text{ mm} =< \text{Deff} =< 7.0 \text{ mm}. \quad \text{[Conditional Expression 8]}$$

According to certain embodiment, the tunable lens may be disposed adjacent to a lens having the lowest peripheral ray height (e.g., the second lens 401b or the point indicated by "A" in FIG. 13) among the at least four lenses, and the tunable lens may have an effective diameter Deff that satisfies Conditional Expression 9 below:

$$1 \text{ mm} =< \text{Deff} =< 7.0 \text{ mm} \quad \text{[Conditional Expression 9]}$$

According to certain embodiment, the lens assembly may further include a pressing member (e.g., the pressing member 539b in FIGS. 6 to 8) configured to come into contact with the polymer plate, the pressing member having a ring-shape, and an actuator (e.g., the actuator 539a in FIGS. 6 to 8) configured to move the pressing member forward and backward along the optical axis, wherein the pressing member may be configured to move at least a portion of the polymer plate along the optical axis in response to the operation of the actuator.

According to certain embodiment, the pressing member configured to deform the polymer plate, thereby changing a thickness of the tunable lens such that a thickness change of the tunable lens at a point where the polymer plate and the pressing member are in contact with each other may be inversely proportional to a thickness change of the tunable lens on the optical axis.

According to certain embodiment, among the at least four lenses, the first lens (e.g., the first lens 401a in FIG. 4 or FIG. 13) disposed on the object side may have a convex object-side surface and have positive power, and the tunable lens may have an effective diameter Deff, that satisfies Conditional Expression 10 below:

$$1\ mm=<Deff=<7.0\ mm \quad \text{[Conditional Expression 10]}$$

According to certain embodiments, the lens assembly may satisfy Conditional Expression 11 below:

$$1.0=<(H\text{tun\_max})/(H\text{tot\_min})=<3.0 \quad \text{[Conditional Expression 11]}$$

where "Htun_max" represents the maximum height of marginal ray of the tunable lens (e.g., the second height (Htun_max) in FIG. 13), and "Htot_min" represents the minimum height of marginal ray of the entire lens assembly (e.g., the first height (Htot_min) in FIG. 13).

According to certain embodiments disclosed herein, an electronic device (e.g., the electronic device 100 or 200 of FIGS. 1 to 3) may include a housing (e.g., the housing 110 in FIGS. 1 and 2), a display (e.g., the display 101 or 230 in FIGS. 1 to 3) disposed on a first surface (e.g., the first surface 110A in FIG. 1) of the housing, and at least one lens assembly (e.g., the camera modules 103, 112, and 113 in FIGS. 1 and 2, the lens assembly 400 in FIG. 4, or the camera 500 in FIG. 5) described above, the lens assembly being disposed on the first surface or a second surface (e.g., the second surface 110B in FIG. 2) of the housing that faces away from the first surface.

According to certain embodiment, the electronic device described above may be configured to perform a focusing operation by adjusting the power or curvature of the tunable lens.

Although the disclosure has been described with reference to certain embodiments as an example, it should be understood that the certain embodiments are intended to be exemplary and are not limiting the disclosure. It will be apparent to those skilled in the art that various changes can be made in form and detail without departing from the overall scope of the disclosure, including the appended claims and equivalents to the same.

What is claimed is:

1. A lens assembly comprising:
a first lens, a second lens, a third lens, a fourth lens, a fifth lens, a sixth lens, and a seventh lens sequentially arranged along an optical axis from an object side to a sensor side; and
a tunable lens disposed between the second lens and third lens, the tunable lens configured to change power or curvature, and
wherein the lens assembly is configured to:
substantially align a central ray and a marginal ray without a focus deviation when a subject at one distance of 1 m or more is imaged, and
align the central ray and the marginal ray with a focus deviation of about 0.01 mm when a subject at one distance between 30 cm-1 m is imaged, and
wherein the lens assembly has a length between an object-side surface of the furthest lens among the at least four lenses and a sensor surface of an image sensor of about 7.83 mm, a field of view of about 82.34 degrees, and an F-number of 1.90.

2. The lens assembly of claim 1, wherein the first lens has a convex object-side surface and has positive power.

3. The lens assembly of claim 1, wherein the tunable lens has an effective diameter, Deff, that satisfies Conditional Expression 2 below:

$$1\ mm \leq Deff \leq 7.0\ mm \quad \text{[Equation 2]}.$$

4. The lens assembly of claim 1, wherein the tunable lens includes:
a transparent plate disposed as an object-side surface or a sensor-side surface;
a polymer plate disposed to face the transparent plate and having a changeable curvature;
a sealing member coupling the transparent plate and the polymer plate to each other, and sealing a space between the transparent plate and the polymer plate; and
a liquid or gel medium accommodated in the space between the transparent plate and the polymer plate,
wherein the tunable lens is configured to have each of a positive power, power of 0 (zero), and a negative power depending on the curvature of the polymer plate.

5. The lens assembly of claim 4, wherein the polymer plate is configured to deform in response to an external force, thereby changing a thickness of the tunable lens at least on the optical axis.

6. The lens assembly of claim 4, further comprising:
a pressing member configured to come into contact with the polymer plate, the pressing member having a ring-shape; and
an actuator configured to move the pressing member forward and backward along the optical axis,
wherein the pressing member is configured to move at least a portion of the polymer plate along the optical axis in response to an operation of the actuator.

7. The lens assembly of claim 6, wherein the polymer plate to partially move or deform by the pressing member thereby changing a thickness of the tunable lens, such that a thickness change of the tunable lens at a point where the polymer plate and the pressing member are in contact with each other is inversely proportional to a thickness change of the tunable lens on the optical axis.

8. The lens assembly of claim 4, wherein the medium has a refractive index that satisfies Conditional Expression 3 below:

$$1.25 \leq n1/n2 \leq 1.7 \quad \text{[Conditional Expression 3]}$$

where "n1" represents a refractive index of the medium, and "n2" represents a refractive index of another medium distributed in an outer space around the tunable lens.

9. The lens assembly of claim 4, wherein depending on the power of the tunable lens, a thickness of the tunable lens is changed to satisfy Conditional Expression 4 below:

$$Tn < T0 < Tp \quad \text{[Conditional Expression 4]}$$

where "Tn" represents thickness of the tunable lens on the optical axis when the tunable lens has negative power, "T0" represents thickness of the tunable lens on the optical axis when the tunable lens has power of 0 (zero), and "Tp" represents thickness of the tunable lens on the optical axis when the tunable lens has positive power.

10. The lens assembly of claim 4, wherein depending on the power of the tunable lens, a thickness of the tunable lens and an air gap are changed to satisfy Conditional Expression 5 below:

$$Tn/Tan < T0/Ta0 < Tp/Tap \qquad \text{[Conditional Expression 5]}$$

where "Tn" represents thickness of the tunable lens on the optical axis when the tunable lens has negative power, "T0" represents thickness of the tunable lens on the optical axis when the tunable lens has power of 0 (zero), "Tp" represents thickness of the tunable lens on the optical axis when the tunable lens has positive power, "Tan" represents an air gap between the tunable lens and a lens facing the polymer plate among the at least four lenses on the optical axis when the tunable lens have negative power, "Ta0" represents the air gap between the tunable lens and the lens facing the polymer plate among the at least four lenses when the tunable lens has power of 0 (zero), and "Tap" represents the air gap between the tunable lens and the lens facing the polymer plate among the at least four lenses when the tunable lens has positive power.

11. The lens assembly of claim 1, wherein the tunable lens is disposed adjacent to a lens having a lowest peripheral ray height among the at least four lenses.

12. An electronic device comprising:
a housing;
a display disposed on a first surface of the housing; and
at least one lens assembly according to claim 1.

13. The lens assembly of claim 1, wherein:

$$1.0 \leq (H\text{tun\_max})/(H\text{tot\_min}) \leq 1.08$$

where "Htun_max" represents a maximum height of marginal ray of the tunable lens, and "Htot_min" represents a minimum height of marginal ray of the entire lens assembly.

14. A lens assembly comprising:
a first lens, a second lens, a third lens, a fourth lens, a fifth lens, a sixth lens, and a seventh lens sequentially arranged along an optical axis from an object side to a sensor side; and
a tunable lens disposed between the second and the third lens, the tunable lens configured to change a power of the tunable lens,
wherein the tunable lens includes:
a transparent plate disposed as an object-side surface or a sensor-side surface;
a polymer plate facing the transparent plate and configured to change curvature;
a sealing member coupling the transparent plate and the polymer plate to each other, and sealing a space between the transparent plate and the polymer plate; and
a liquid state or gel state medium accommodated in the space between the transparent plate and the polymer plate,
wherein the liquid state or gel state medium has a refractive index n1 that satisfies Conditional Expression 7 below:

$$1.25 \leq n1 \leq 1.7, \qquad \text{[Conditional Expression 7]}$$

wherein the lens assembly is configured to;
substantially align a central ray and a marginal ray without a focus deviation when a subject at one distance of 1 m or more is imaged, and
align the central ray and the marginal ray with a focus deviation of about 0.01 mm when a subject at one distance between 30 cm-1 m is imaged.

15. The lens assembly of claim 14, wherein the tunable lens has an effective diameter Deff that satisfies Conditional Expression 8 below:

$$1 \text{ mm} \leq \text{Deff} \leq 7.0 \text{ mm} \qquad \text{[Conditional Expression 8]}.$$

16. The lens assembly of claim 14, wherein the tunable lens is disposed adjacent to a lens having a lowest peripheral ray height among the at least four lenses, and
the tunable lens has an effective diameter Deff that satisfies Conditional Expression 9 below:

$$1 \text{ mm} \leq \text{Deff} \leq 7.0 \text{ mm} \qquad \text{[Conditional Expression 9]}.$$

17. The lens assembly of claim 14, further comprising:
a pressing member configured to come into contact with the polymer plate, the pressing member having a ring-shape; and
an actuator configured to move the pressing member forward and backward along the optical axis,
wherein the pressing member is configured to move at least a portion of the polymer plate along the optical axis in response to an operation of the actuator.

18. The lens assembly of claim 17, wherein the pressing member is configured to deform the polymer plate, thereby changing a thickness of the tunable lens, such that a thickness change of the tunable lens at a point where the polymer plate and the pressing member are in contact with each other is inversely proportional to a thickness change of the tunable lens on the optical axis.

19. The lens assembly of claim 14, wherein the first lens has a convex object-side surface and has positive power, and
the tunable lens has an effective diameter Deff that satisfies Conditional Expression 10 below:

$$1 \text{ mm} \leq \text{Deff} \leq 7.0 \text{ mm} \qquad \text{[Conditional Expression 10]}.$$

20. The lens assembly of claim 14, wherein the lens assembly satisfies Conditional Expression 11 below:

$$1.0 \leq (H\text{tun\_max})/(H\text{tot\_min}) \leq 3.0 \qquad \text{[Conditional Expression 11]}$$

where, "Htun_max" represents a maximum height of marginal ray of the tunable lens, and "Htot_min" represents a minimum height of marginal ray of the entire lens assembly.

21. An electronic device comprising:
a housing;
a display disposed on a first surface of the housing; and
at least one lens assembly according to claim 12.

* * * * *